United States Patent [19]
Carle

[11] 4,198,829
[45] Apr. 22, 1980

[54] CRYOPUMPS

[75] Inventor: Jacques Carle, Saint Martin D'Heres, France

[73] Assignee: L'Air Liquide, Societe Anonyme pour l'Etude et l'Exploitation des Procedes Georges Claude, Paris, France

[21] Appl. No.: 919,944

[22] Filed: Jun. 28, 1978

[30] Foreign Application Priority Data

Jul. 5, 1977 [FR] France ................. 77 20554

[51] Int. Cl.² ................................ B01D 5/00
[52] U.S. Cl. ...................... 62/55.5; 55/269; 417/901
[58] Field of Search .......... 62/55.5, 100, 268; 55/269, DIG. 15; 417/901

[56] References Cited

U.S. PATENT DOCUMENTS

| | | | |
|---|---|---|---|
| 3,019,809 | 2/1962 | Ipsen et al. | 62/55.5 |
| 3,296,773 | 1/1967 | Hemstreet | 55/27 |
| 4,072,025 | 2/1978 | Thibault | 62/55.5 |

FOREIGN PATENT DOCUMENTS 1407342  6/1965  France ................. 62/55.5

*Primary Examiner*—Ronald C. Capossela
*Attorney, Agent, or Firm*—Young & Thompson

[57] ABSTRACT

This invention relates to cryopumps, and consists in the incorporation of walls for trapping by condensation exemplified by outer faces of partitions, and walls for trapping by adsorption, exemplified by inner faces of these partitions. These walls define a confined area in the closed position, in which the adsorbent is isolated from condensable gases. Once these gases have been condensed on the said outer faces, the partitions are opened to place the adsorbent layers in communication with the remainder of the pumping enclosure.

The invention is applicable to the production of high and uncontaminated vacua (in particular for the production of thin films).

7 Claims, 6 Drawing Figures

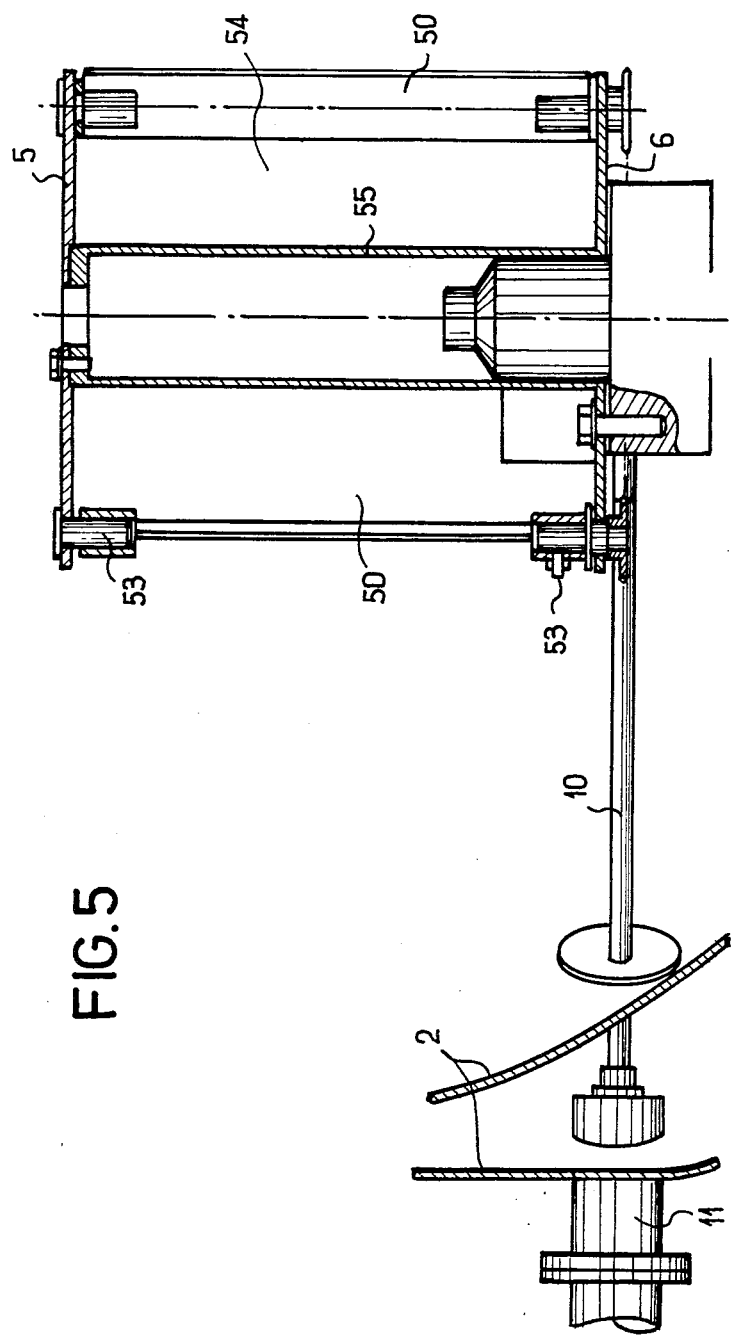

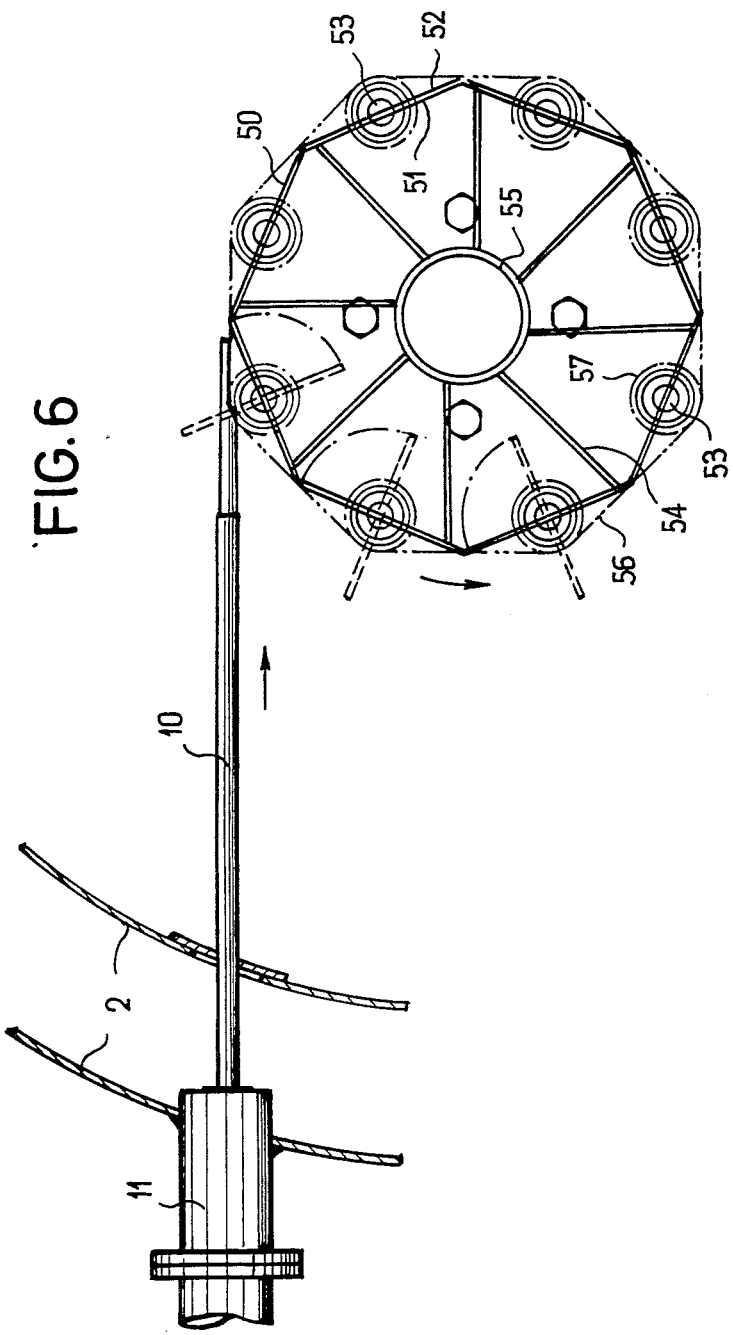

CRYOPUMPS

BACKGROUND OF THE INVENTION

The present invention relates to cryopumps of the kind which incorporate, within a thermally insulated enclosure, trapping means comprising refrigerated walls for trapping by condensation, and walls for trapping by adsorption which are covered with at least one layer of adsorbent substances such as activated carbon or zeolites. By combining these two trapping means it is possible, at least in theory, to achieve extremely high vacua, of the order of $10^{-x}$ Torr, by virtue of the fact that gases which are difficult to condense even at very low trapping pressures, such as hydrogen and neon, are trapped by the walls for trapping by adsorption. However, the effectiveness of the walls for trapping by adsorption is considerably reduced by the fact that they become contaminated by more easily condensed gases such as nitrogen, oxgen and argon. It has proved possible to alleviate this drawback by placing the walls for trapping by adsorption downstream of the walls for trapping by condensation with reference to the flow of the gases, which latter walls also advantageously include a wall forming a baffle which shields the walls for trapping by adsorption from direct impingement of the gases.

A baffle of this kind has at least three disadvantages. Firstly, it is expensive to produce, secondly, if it is to be efficient under molecular conditions it needs to be optically sealed, which results in a considerable reduction in the pumping rate of the adsorbent covered surface, and finally, no matter what its design, it performs virtually no protective function for the adsorbent then the conditions under which the gases flow in the enclosure are viscous or intermediate, which may occur in certain applications of the cryopump.

Another method of pumping by adsorption has also been proposed which consists in depositing on the cryosurface a gas which condenses at the temperature concerned and which as the property of being adsorbent to the incondensable gases (a deposit of $CO_2$ for example has the property of being adsorbent to hydrogen at 20° K.). Firstly, this deposit of adsorbent gas suffers from the same drawbacks as a solid adsorbent, as described above, and secondly, when the adsorbent gas is injected onto the cryosurface there is always a rise in pressure in the enclosure either as a result of an excess of injected gas or as a result of surface heating of the cryodeposit already present, and this rise in pressure is generally undesirable.

A first object of the invention is to provide a sorption cryopump having a high pumping efficiency, i.e. a maximum pumping rate under molecular conditions and good protection for the adsorbent under viscous or intermediate conditions.

A second object of the invention is to provide a cryopump in which adsorbent gas is injected but any rise in pressure in the enclosure when the adsorbent gas is injected is prevented.

SUMMARY OF THE INVENTION

In order to achieve the above and other objects, the invention provides a cryopump which includes partitioning means which define a confined area and which comprises at least one partition which is moveable under the prompting of a control means accessible from outside the said enclosure, from a closed position in which the confined area is isolated from the remainder of the enclosure, to a position in which there is communication between said confined area said remainder of the enclosure, the layers of adsorbent substance being situated in said confined area when said partitioning means is in said closed position.

In this way it is possible to preserve the walls for trapping by adsorption in the fully regenerated state in all the phases preliminary to that in which they finally come into action to capture the last residual amounts of gases which are very difficult to condense. Since they are not exposed to the more easily condensed gases, which are trapped by the condensing walls, the effectiveness of the walls for trapping by adsorption remains complete and undiminished.

BRIEF DESCRIPTION OF THE DRAWINGS

The features and advantages of the invention wall become apparent from the following description, which is given by way of example with reference to the accompanying drawings in which:

FIGS. 5 and 6 are more detailed views, in elevational cross-section and from above, respectively, of the control arrangement fitted to another, modified embodiment of cryopump.

DETAILED DESCRIPTION OF PREFERRED EMBODIMENTS

Figure 1:
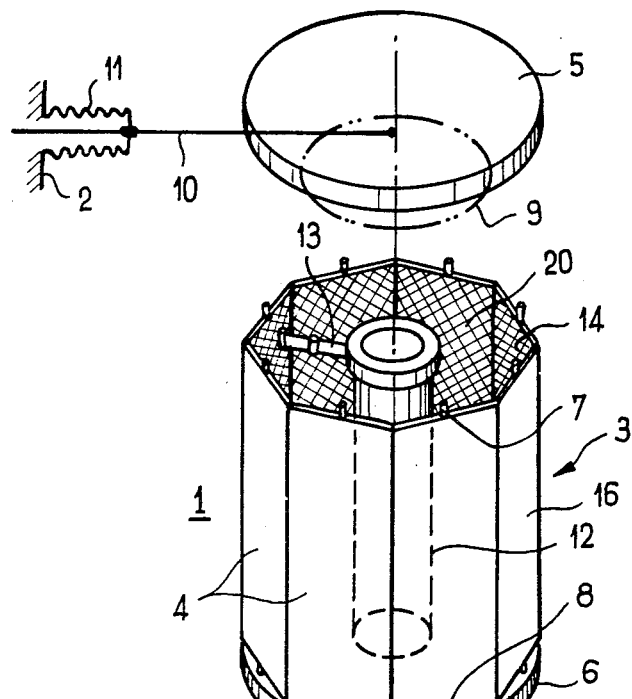
FIG. 1 is a partial diagrammatic perspective view, of which part is exploded, of a cryopump according to the invention in the initial pumping phase.
Figure 2:
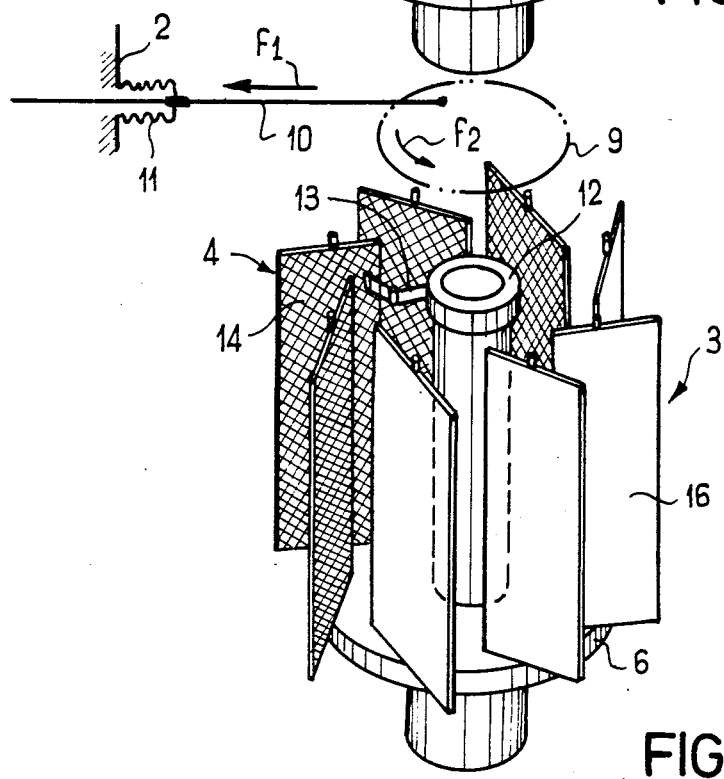
FIG. 2 is a view of the cryopump shown in FIG. 1 in the final pumping phase.
Figure 3:
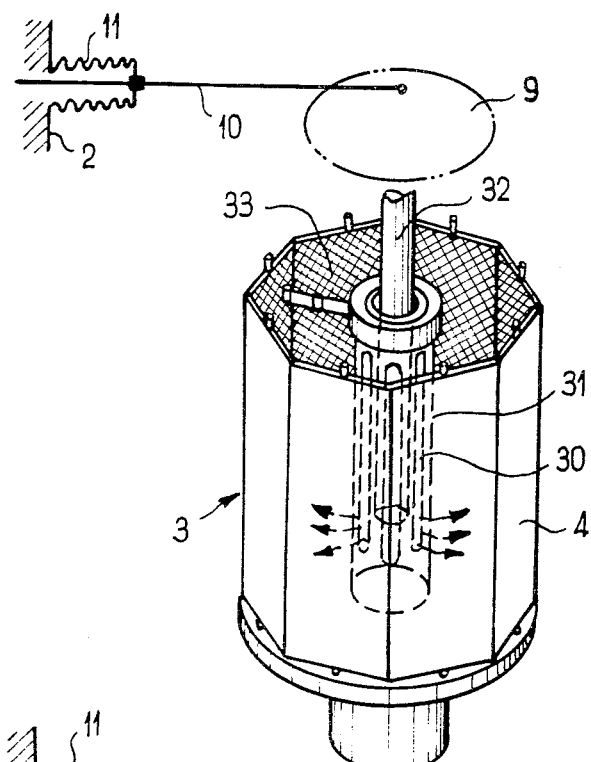
FIGS. 3 and 4 are views similar to FIGS. 1 and 2 of a modified embodiment.
Figure 4:
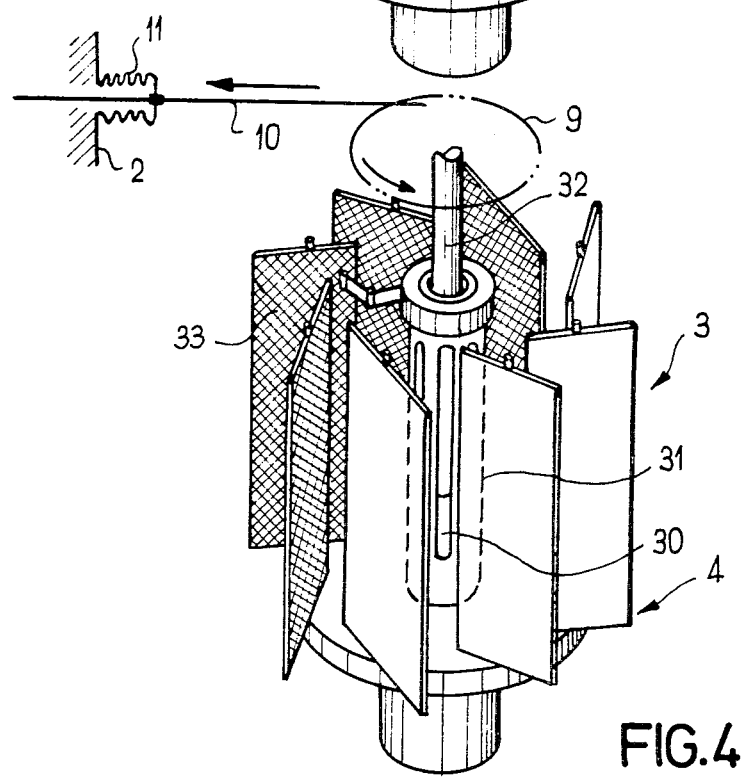

Referring now to the drawings, and firstly to FIGS. 1 and 2, in a pumping enclosure 1 of which a part of the wall 2 is shown, there is positioned a cryopump body formed by partitioning means 3 made up of a plurality of longitudinal partitions 4 (eight in number) which extend in an arrangement of polygonal outline between two end partitions 5 and 6. The partitions 4 are mounted on longitudinal axes defined by lugs 7 and 8 which engage in pivot bearings in the end partitions 5 and 6. Underneath the end partition 5, a ring 9 is mounted to rotate circumferentially, which ring may be caused to rotate by a linkage 10 which passes through the enclosure wall 2 via a sealed joint 11. The ring 9 is secured to a circumferentially pivoting part 12 and part 12 is mechanically connected to each partition 4 by a hinged link 13 so that, starting from the fully closed position shown in FIG. 1, traction on the linkage 10 in the direction of arrow f1, the effect of which is to produce a circumferential rotating movement in the direction of f2, produces, via links 13, a rotary opening movement which produces extensive communication between a confined area 20 which is defined by the partitions, 4, 5 and 6 when in the closed position, and the remainder of the enclosure 1.

The partitions 4 have the particular feature of being metallic and are preferably of a metal which is thermally conductive. They are coated on only one face with a layer 14 of adsorbent substance which is generally in the form of particles of activated carbon or zeolites which are bonded to the metal surface or embedded in the metal. Refrigerating means, such as welded tubes, carry helium at 20° K. to enable the partitions 4 to be cooled. In the present embodiment, the inside faces